(12) United States Patent
Wu et al.

(10) Patent No.: US 6,684,014 B2
(45) Date of Patent: Jan. 27, 2004

(54) MICRO-OPTIC ADHESIVE ASSEMBLY AND METHOD THEREFOR

(75) Inventors: Li Wu, Fuxing (CN); Jiwu Ling, Fuxing (CN); Weimin Chen, Fuxing (CN); Chenggang Xin, Fuxing (CN); Zhen Miao, Fuxing (CN); Cuilian Zhan, Fuxing (CN)

(73) Assignee: JDS Uniphase Corporation, San Jose, CA (US)

( * ) Notice: Subject to any disclaimer, the term of this patent is extended or adjusted under 35 U.S.C. 154(b) by 196 days.

(21) Appl. No.: 09/967,483

(22) Filed: Sep. 28, 2001

(65) Prior Publication Data

US 2002/0051608 A1 May 2, 2002

(30) Foreign Application Priority Data

Sep. 29, 2000 (CN) .......................... 00112593 A

(51) Int. Cl.$^7$ .............. G02B 6/26; G02B 6/42
(52) U.S. Cl. .................................. 385/51
(58) Field of Search .............. 385/95, 97, 98, 385/99, 51

(56) References Cited

U.S. PATENT DOCUMENTS 6,012,856 A * 1/2000 Kim et al. ............ 385/99

* cited by examiner

Primary Examiner—Javaid H. Nasri
(74) Attorney, Agent, or Firm—Allen, Dyer, Doppelt, Milbrath & Gilchrist, P.A.

(57) ABSTRACT

The invention relates to a micro-optic adhesive assembly and a method for making a micro-optic assembly. The method of joining optical assemblies in accordance with the present invention improves the strength and shock resistance of adhesive joints in micro-optic devices without affecting the optical path. The adhesive assembly of the present invention has sufficiently flexibility to be able to conform to different alignment geometries without introducing significant bulk or thermal expansion incompatibility. Further the improved method is compatible with the device manufacturing techniques and does not add significant manufacturing complexity. An optical device in accordance with the invention comprises: a first optical element having an optical path therethrough and having a coupling end face; a second optical element having an optical path therethrough and having a coupling end face optically coupled to the coupling end face of the first optical element such that light propagating on the optical path of the first element couples to the optical path of the second element; an adhesive joint between the coupling end face of the first element and the coupling end face of the second element, such that adhesive is not in the optical paths therethrough; and a plurality of flexible crossties each secured to an exterior surface of the first element and to an exterior surface of the second element to reinforce the adhesive joint.

7 Claims, 3 Drawing Sheets

MICRO-OPTIC ADHESIVE ASSEMBLY AND METHOD THEREFOR

CROSS-REFERENCE TO RELATED APPLICATIONS

This is the first application filed for the present invention.

MICROFICHE APPENDIX

Not Applicable.

TECHNICAL FIELD

The present application relates to a micro-optic adhesive assembly and a method for making a micro-optic assembly.

BACKGROUND OF THE INVENTION

In the manufacture of micro-optic components, especially for the telecommunications industry, many optical devices comprise assemblies including adhesive joints particularly between planar surfaces. For instance, Wavelength Division Multiplexers (WDM), Dense Wavelength Division Multiplexers (DWDM) and Hybrid multifunction devices include assemblies of fiber tubes and rod lenses, lenses and filters, etc.

Typically prior art construction has used an epoxy with good transparency between optical elements. However, epoxy is not completely transparent or uniform to transmission. Transmission of light though the epoxy layer results in some loss. In order to remove the epoxy from the optical path, the current manufacturing technique is to apply epoxy only to the perimeter of the coupling faces of the elements. This significantly reduces the surface area that is secured and consequently reduces the strength of the joint.

Optical components must be quite robust to withstand environmental and physical stresses in operation. Reliability of components, which are often remotely located and difficult and costly to access and maintain or replace, is critical. Components are tested to withstand gravitational forces of at least 500 G.

UV curable epoxy has good transparency and is convenient for manufacture. Unfortunately, it is not as strong as other adhesives. When the surface area of the joint is reduced to provide an unobstructed optical path, the joint is not sufficiently strong. Exposure to moisture can further weaken UV adhesive joints. One method of strengthening the construction used in the prior art is to provide an additional layer of heat curable epoxy over the UV epoxy on the exterior surface of the joint, as shown in FIG. 1. However, when the mass of heat curable epoxy is sufficient to provide strength to the joint, a further problem of thermal expansion is introduced. Heat curable epoxy has a relatively large coefficient of expansion, and differential expansion due to temperature change can lead to disrupting the optical coupling of the assembly.

A better method of joining optical assemblies is needed in order to improve the strength and shock resistance of adhesive joints without affecting the optical path. An improved assembly method should be sufficiently flexible, and must be able to conform to different alignment geometries. The assembly method should not introduce significant bulk or thermal expansion incompatibility. Further an improved method should be compatible with the device manufacturing techniques and not add significant manufacturing complexity.

SUMMARY OF THE INVENTION

Accordingly, an object of the present invention is to provide method of joining optical assemblies in order to improve the strength and shock resistance of adhesive joints in micro-optic devices and micro-optic devices including shock resistant adhesive joints.

Thus an aspect of the present invention provides a micro-optic assembly comprising:
  a first optical element having an optical path therethrough and having a coupling end face;
  a second optical element having an optical path therethrough and having a coupling end face optically coupled to the coupling end face of the first optical element forming a joint therebetween, such that light propagating on the optical path of the first element couples to the optical path of the second element;
  a plurality of flexible crossties each secured to an exterior surface of the first element and to an exterior surface of the second element to reinforce the joint.

In further preferred embodiments, the crossties are secured at a first end to the first element and at a second end to the second element. The joint can further include an adhesive layer surrounding an exterior surface of the coupled end faces. The crossties can pass through this adhesive layer. The joint preferably includes an adhesive layer between the coupling end face of the first element and the coupling end face of the second element, such that adhesive is not in the optical paths therethrough. Preferably the crossties comprise elongate flexible members selected from fibers, strips or wires, such as sections of stripped optical fiber. In a further preferred embodiment, the first optical element comprises a ferrule supporting at least one optical fiber, and the second optical element comprises a lens.

Thus a further aspect of the invention provides a method of joining a first optical element to a second optical element comprising the steps of:
  providing a first optical element having an optical path therethrough and a coupling end face;
  providing a light through the optical path of the first optical element;
  providing a second optical element having an optical path therethrough and a coupling end face;
  varying the position of at least one of the optical elements until light through the optical path of the first element is optimally coupled through the optical path of the second element;
  joining the coupling end faces;
  securing a first end of each of a plurality of crossties to an exterior surface of the first element; and,
  securing a second end of each of the plurality of crossties to an exterior surface of the second element such that the crossties span the joined coupled end faces.

Some optical components, such as filters, are affected by stresses caused by the epoxy on the surface. These components similarly benefit by having as little epoxy on the coupled surfaces as possible.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
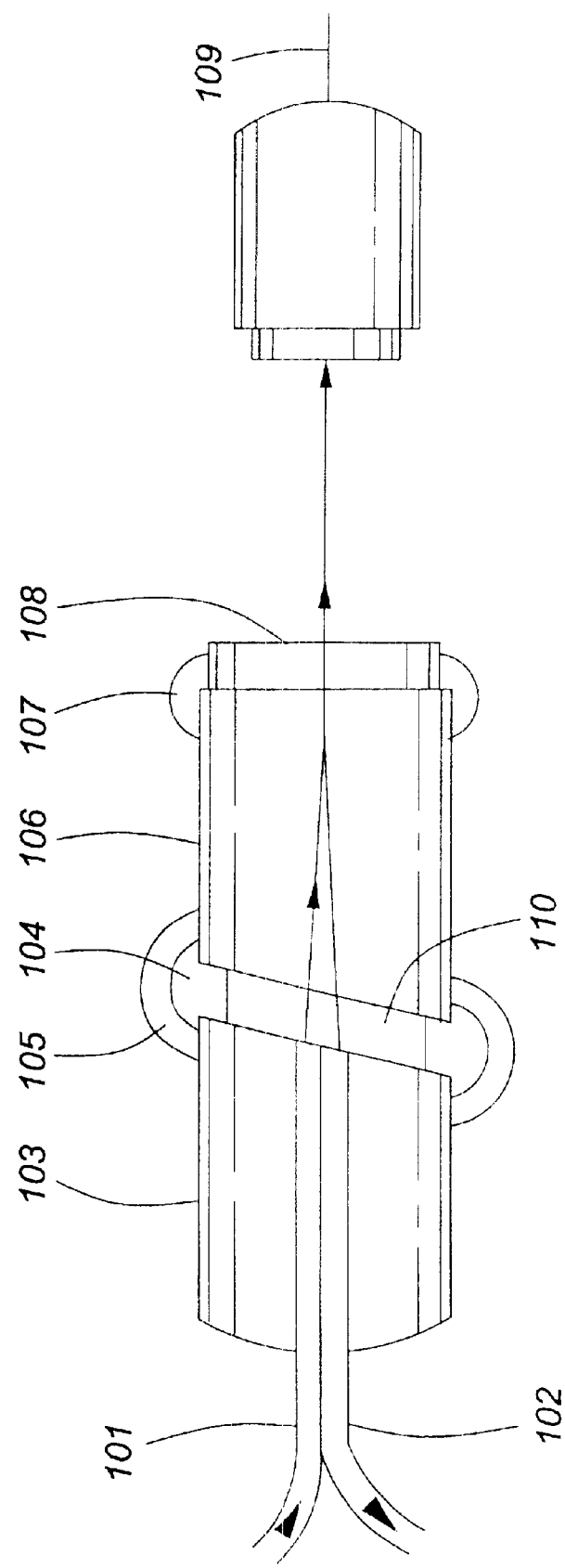
FIG. 1 is a schematic illustration of a prior art WDM assembly.

FIG. 1 illustrates a prior art WDM assembly in which an input optical fiber 101 and an output optical fiber 102 are supported in position by a ferrule 103. The ferrule 103 is coupled to a lens 106 through an air space 110 surrounded by an annular UV epoxy layer 104 and a larger heat cured epoxy layer 105. At an opposite end of the lens 106, a filter 108 is adhered by a further annular layer of adhesive 107. Arrows illustrate an input signal on fiber 101, which is coupled through the space 110 into the lens 106 and partially reflected into fiber 102. A portion of the signal passes through the filter 108 to the receiver 109.

The prior art adhesive joint shown in FIG. 1 removes the epoxy from the optical path by applying UV curable adhesive around the smaller diameter spacer. On its own this does not form a strong enough joint. A mass of heat curable adhesive 105 having stronger adhesive properties is subsequently placed over the joint to strengthen the device. This is not satisfactory because heat curable adhesive has a high coefficient of thermal expansion. The differential expansion of the heat curable adhesive and the other elements of the device in response to changes in temperature can force the optical elements out of alignment causing the device to fail.

Figure 2:
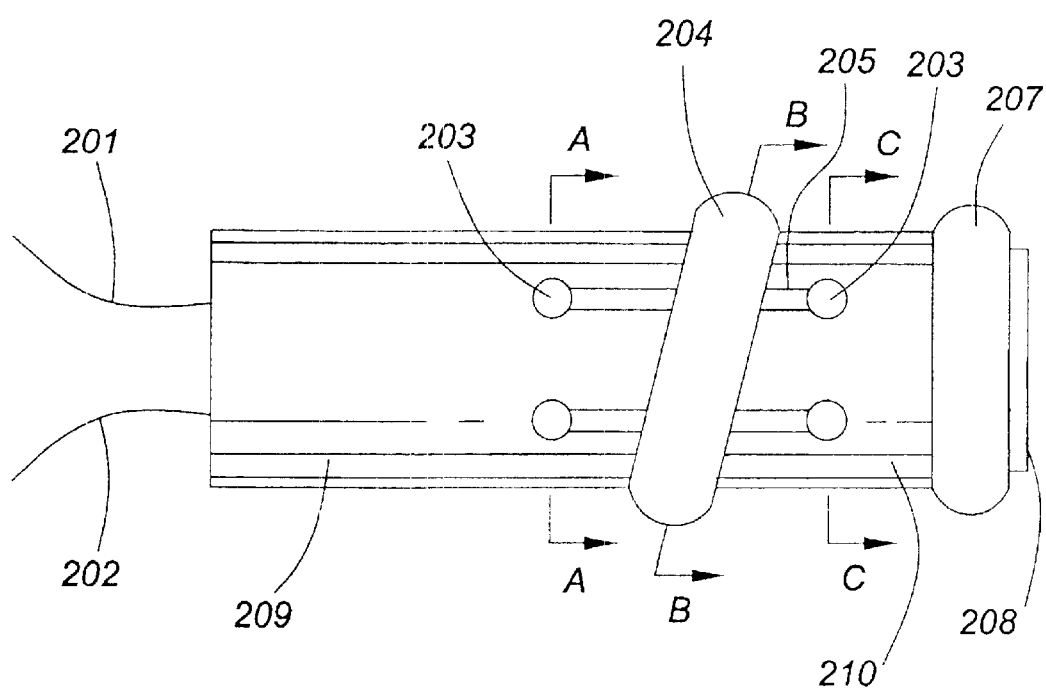
FIG. 2 is a schematic illustration of a filter assembly in accordance with the present invention.

An example of an assembly in accordance with the present invention is shown in FIG. 2. Input and output fibers 201, 202 are supported in a ferrule 209. The fibers 201, 202 are optically coupled to a lens 210. A planar coupling end face (not shown in this view) of the ferrule 209 is secured to a coupling end face of the lens 210 using a small amount of UV curable adhesive on the periphery of the end faces. A bead of UV curable epoxy 204 is applied about the exterior surface of the joint. At least two crossties 205 comprising sections of stripped optical fiber are secured with epoxy 203 at their ends on the exterior surfaces of the ferrule 209 and the lens 210. At these locations 203 the epoxy can be UV or heat curable epoxy or other adhesive, since the thermal effects will not damage the device. A filter 208 is secured to an opposite end face of the lens 210 with an annular bead of epoxy 207.

Figure 3:
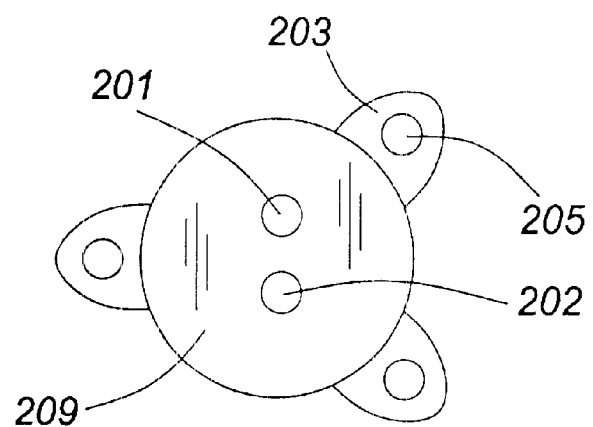
FIG. 3 is a schematic illustration of the cross-section at A—A from FIG. 2.

FIG. 3 shows the cross-section through the ferrule 209 in FIG. 2 at line A—A. The optical fibers 201,202 are supported in bores of the ceramic or glass ferrule 209. Three optical fiber crossties 205 can be seen evenly distributed about the exterior surface of the ferrule 209. Each crosstie 205 is secured in epoxy 203. The crossties must be constructed of flexible, relatively small bands such as fibers, wires or strips, of glass, polymer of metal.

Figure 4:
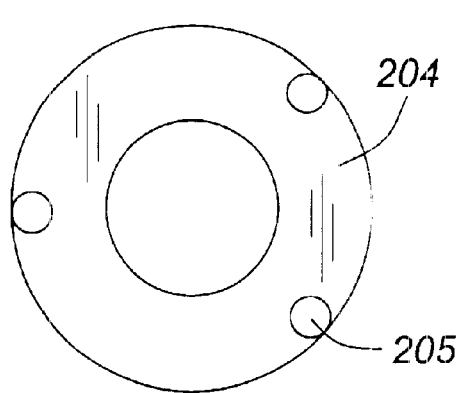
FIG. 4 is a schematic illustration of the cross-section at B—B from FIG. 2.

FIG. 4 shows the cross-section through the joint at the end faces at line B—B in FIG. 2. (Note that the scale is different than FIGS. 2, 3 and 5.) FIG. 4 shows the end face of the lens 210 and the annular layer or bead of epoxy 204, with the crossties 205 encased in the epoxy layer.

Figure 5:
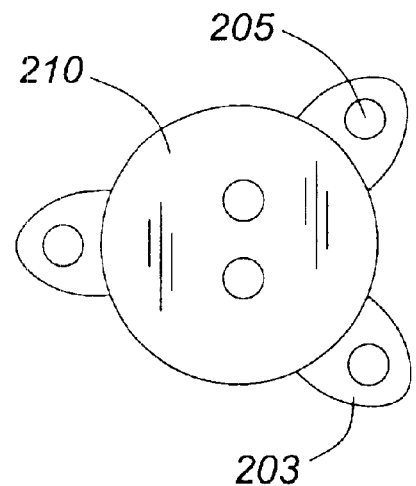
FIG. 5 is a schematic illustration of the cross-section at C—C from FIG. 2.

FIG. 5 shows the cross-section through the lens 210 in FIG. 2 at line C—C. Similar to FIG. 3, the optical fiber crossties 205 can be seen secured by epoxy 203 about the exterior surface of the lens 210. The crossties can be secured only at their ends. Or instead of providing the annular epoxy layer 204, epoxy can be applied along the length of the crossties to provide strength to the joint.

The lens to fiber tube assembly is one of the most common. However, the assembly method in accordance with the present invention can be used to assemble various micro-optic elements. A pair of GRIN lenses may be secured about a filter, for instance, with crossties secured across the filter from one lens to the other. Larger bored sleeves supporting micro-optic elements can also be more securely joined using the method in accordance with the present invention.

An assembly method in accordance with the present invention involves aligning and securing two optical elements without applying adhesive in the optical path. The next step includes applying adhesive to the exterior surfaces of the two optical elements and applying the crosstie fibers to the adhesive across the joint. Aligning the optical elements may involve offsetting the central axes of the elements. Thus the flexibility of the crossties is important to adapt to different configurations and still provide strength to the joint. The crossties can be positioned into the annular epoxy layer, or the epoxy can be applied over the crossties.

The embodiment of the invention described above is intended to be exemplary only. The scope of the invention is therefore intended to be limited solely by the scope of the appended claims.

What is claimed is:

1. A micro-optic assembly comprising:
    a first optical element having an optical path therethrough and having a coupling end face;
    a second optical element having an optical path therethrough and having a coupling end face optically coupled to the coupling end face of the first optical element forming a joint therebetween, such that light propagating on the optical path of the first element couples to the optical path of the second element; and
    a plurality of flexible crossties each secured to an exterior surface of the first element and to an exterior surface of the second element to reinforce the joint; wherein the crossties are secured at a first end to the first element and at a second end to the second element; wherein the joint further includes an adhesive layer surrounding an exterior surface of the coupled end faces; and wherein the crossties pass through the adhesive layer.

2. A micro-optic assembly as defined in claim 1, wherein the crossties comprise elongate flexible members selected from the group consisting of fibers, strips and wires.

3. A micro-optic assembly as defined in claim 2, wherein the crossties comprise optical fiber.

4. A micro-optic assembly as defined in claim 3, wherein the first optical element comprises a ferrule supporting at least one optical fiber, and the second optical element comprises a lens.

5. A method of joining a first optical element to a second optical element comprising the steps of:
    providing a first optical element having an optical path therethrough and a coupling end face;
    providing a light through the optical path of the first optical element;
    providing a second optical element having an optical path therethrough and a coupling end face;
    varying the position of at least one of the optical elements until light through the optical path of the first element is optimally coupled through the optical path of the second element;

joining the coupling end faces;

providing a substantially annular adhesive layer to an exterior of the joined coupled end faces;

securing a first end of each of a plurality of crossties to an exterior surface of the first element; and, securing a second end of each of the plurality of crossties to an exterior surface of the second element; such that the crossties span the joined coupled end faces, and pass through the annular adhesive layer.

6. A method as defined in claim 5 wherein the step of joining the coupling end faces includes applying adhesive to at least one coupling end face outside the optical path.

7. A method as defined in claim 5 wherein the steps of securing a first end of each of the plurality of crossties to an exterior surface of the first element, and of securing a second end of each of the plurality of crossties to an exterior surface of the second element comprise applying adhesive along the length of the crossties on the exterior surfaces of the first and second elements.

* * * * *